United States Patent
Laslo-Amit et al.

(10) Patent No.: US 10,104,640 B2
(45) Date of Patent: *Oct. 16, 2018

(54) SLICE-BASED TRACKING AREAS

(71) Applicant: Cisco Technology, Inc., San Jose, CA (US)

(72) Inventors: Shay Laslo-Amit, Kfar Saba (IL); Alon Ben Ami, Gedera (IL); Ziv Nuss, Tsur Yigal (IL); Vladimir Yanover, Kfar Saba (IL); Lawrence Sol Rublin, Beit Shemesh (IL)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/830,014

(22) Filed: Dec. 4, 2017

(65) Prior Publication Data
US 2018/0160395 A1 Jun. 7, 2018

Related U.S. Application Data

(63) Continuation of application No. 15/369,910, filed on Dec. 6, 2016, now Pat. No. 9,888,455.

(51) Int. Cl.
*H04W 68/02* (2009.01)
*H04W 24/02* (2009.01)
(Continued)

(52) U.S. Cl.
CPC ............ *H04W 68/02* (2013.01); *H04W 8/02* (2013.01); *H04W 24/02* (2013.01); *H04W 88/02* (2013.01); *H04W 88/08* (2013.01)

(58) Field of Classification Search
CPC ....... H04W 68/02; H04W 8/02; H04W 24/02; H04W 88/02; H04W 88/08; H04W 4/029;
(Continued)

(56) References Cited

U.S. PATENT DOCUMENTS 5,729,826 A * 3/1998 Gavrilovich .......... H04W 88/08
  455/11.1
8,594,014 B2 * 11/2013 Kamalaraj ............ H04W 60/00
  370/328

(Continued)

FOREIGN PATENT DOCUMENTS

EP      1276342        1/2003
WO   WO 2017018838 A1 *  2/2017  ............. H04W 8/04

OTHER PUBLICATIONS

Azuma, Nobuhiru et al.; "Communication Characteristic-Aware Signaling Traffic Optimization Method for Mobile Networks"; 2015 IEEE Wireless Communications and Networking Conference (WCNC); New Orleans, LA, 2015; pp. 2079-2084.

(Continued)

*Primary Examiner* — Meless Zewdu

(57) ABSTRACT

In one embodiment, a mobile base station includes: an antenna; a transceiver operative to communicate with a user equipment (UE) via said antenna; a processor; and a mobility control application to be executed by said processor and operative: to provide to said UE when in communication with said mobile base station at least a relevant tracking area list from among at least two tracking area lists associated with said mobile base station.

18 Claims, 3 Drawing Sheets

(51) Int. Cl.
*H04W 8/02* (2009.01)
*H04W 88/02* (2009.01)
*H04W 88/08* (2009.01)

(58) Field of Classification Search
CPC ......... H04W 4/02; H04W 4/04; H04W 4/043; H04W 4/046; H04W 68/025; H04W 84/027
See application file for complete search history.

(56) References Cited

U.S. PATENT DOCUMENTS

| | | | | |
|---|---|---|---|---|
| 8,744,474 | B1* | 6/2014 | Singh | H04W 68/02 |
| | | | | 455/453 |
| 8,761,768 | B2* | 6/2014 | Kamalaraj | H04W 24/00 |
| | | | | 455/435.1 |
| 9,198,158 | B2 | 11/2015 | Knauft | |
| 9,277,528 | B1* | 3/2016 | Talley | H04W 60/04 |
| 2003/0013445 | A1 | 1/2003 | Fujiwara et al. | |
| 2009/0042587 | A1* | 2/2009 | Kamdar | H04W 68/06 |
| | | | | 455/458 |
| 2009/0181672 | A1 | 7/2009 | Horn et al. | |
| 2010/0069062 | A1* | 3/2010 | Horn | H04W 60/00 |
| | | | | 455/434 |
| 2010/0255841 | A1 | 10/2010 | Kubo et al. | |
| 2011/0096721 | A1 | 4/2011 | Kamalaraj et al. | |
| 2011/0306363 | A1* | 12/2011 | Wang | H04W 24/02 |
| | | | | 455/456.1 |
| 2012/0071173 | A1* | 3/2012 | Olsson | H04W 60/04 |
| | | | | 455/456.1 |
| 2012/0115515 | A1* | 5/2012 | Lopez | H04W 68/04 |
| | | | | 455/458 |
| 2013/0183959 | A1 | 7/2013 | Mihály | |
| 2013/0203415 | A1* | 8/2013 | Arvidsson | H04W 60/00 |
| | | | | 455/435.1 |
| 2014/0044058 | A1* | 2/2014 | El-saidny | H04W 72/048 |
| | | | | 370/329 |
| 2014/0226559 | A1* | 8/2014 | Jactat | H04W 36/0055 |
| | | | | 370/315 |
| 2014/0254543 | A1 | 9/2014 | Engelhard et al. | |
| 2014/0295837 | A1* | 10/2014 | Madasamy | H04W 48/04 |
| | | | | 455/435.1 |
| 2014/0342736 | A1* | 11/2014 | Zhang | H04W 60/00 |
| | | | | 455/435.1 |
| 2014/0349570 | A1* | 11/2014 | Pan | H04W 16/26 |
| | | | | 455/11.1 |
| 2015/0148062 | A1 | 5/2015 | Chen et al. | |
| 2015/0163639 | A1* | 6/2015 | Kilpatrick, II | H04W 4/028 |
| | | | | 455/456.1 |
| 2015/0199610 | A1 | 7/2015 | Hershberg | |
| 2015/0296482 | A1 | 10/2015 | Baskar et al. | |
| 2016/0353465 | A1 | 12/2016 | Vrzic et al. | |
| 2016/0353507 | A1 | 12/2016 | Uemura et al. | |
| 2017/0070892 | A1 | 3/2017 | Song et al. | |
| 2017/0079059 | A1 | 3/2017 | Li et al. | |
| 2017/0086049 | A1 | 3/2017 | Vrzic | |
| 2017/0086103 | A1 | 3/2017 | Neves et al. | |
| 2017/0142591 | A1 | 5/2017 | Vrzic | |
| 2017/0164212 | A1 | 6/2017 | Opsenica et al. | |
| 2017/0171801 | A1 | 6/2017 | Viering et al. | |
| 2017/0289791 | A1 | 10/2017 | Yoo et al. | |
| 2017/0303259 | A1 | 10/2017 | Lee et al. | |
| 2017/0311369 | A1 | 10/2017 | Chiba et al. | |
| 2018/0132096 | A1* | 5/2018 | Huo | H04W 8/08 |

OTHER PUBLICATIONS

Lee, Cheng-Wei et al.; "Seamless Handover for High-Speed Trains Using Femtocell-Based Multiple Egress Network Interfaces"; in IEEE Transactions on Wireless Communications, vol. 13, No. 12, pp. 6619-6628, Dec. 2014.
Naboulsi, Diala et al.; "Large-Scale Mobile Traffic Analysis: A Survey"; in IEEE Communications Surveys & Tutorials, vol. 18, No. 1, pp. 124-161, Firstquarter 2016.
Zhou, Xuan et al.; "Network Slicing as a Service: Enabling Enterprises' Own Software-Defined Cellular Networks," in IEEE Communications Magazine, vol. 54, No. 7, pp. 146-153, Jul. 2016.
International Search Report and Written Opinion, dated Feb. 13, 2018, cited in a corresponding WO application (PCT/IB2017/056999).
Interdigital; Introduction of Mobility Descriptor (2016).
Motorola; Network Slices in NFV Developments (2016).

* cited by examiner

SLICE-BASED TRACKING AREAS

RELATED APPLICATION INFORMATION

The present application is a continuation of U.S. application Ser. No. 15/369,910, filed Dec. 6, 2016 and entitled "SLICE-BASED TRACKING AREAS".

FIELD OF THE INVENTION

The present invention generally relates to the definition of tracking areas for network slices in a mobile network.

BACKGROUND OF THE INVENTION

A Tracking Area (TA) is a logical service area within a mobile network. A TA is typically defined according to a list of participating cells, where the cells are grouped into TAs in accordance with geographical and/or mobility correlation/interaction factors. Mobile networks employ TAs to reduce unnecessary signaling interactions with a user equipment (UE). When in an idle state, a UE signals only when it enters/leaves a tracking area. The UE then stays in the idle state until paged by the mobile network throughout the TA (i.e., each cell in the TA) or when a call/session is initiated by the UE. TA based paging techniques are employed in order to reduce overall consumed bandwidth and battery resources, while incurring presumably lower costs for the wake-up page; a broadcast of the as needed page throughout the TA is typically more resource efficient than using continuous polling for a single cell.

BRIEF DESCRIPTION OF THE DRAWINGS

The embodiments of the disclosure will be understood and appreciated more fully from the following detailed description, taken in conjunction with the drawings in which.

DESCRIPTION OF EXAMPLE EMBODIMENTS

Overview

Figure 1:
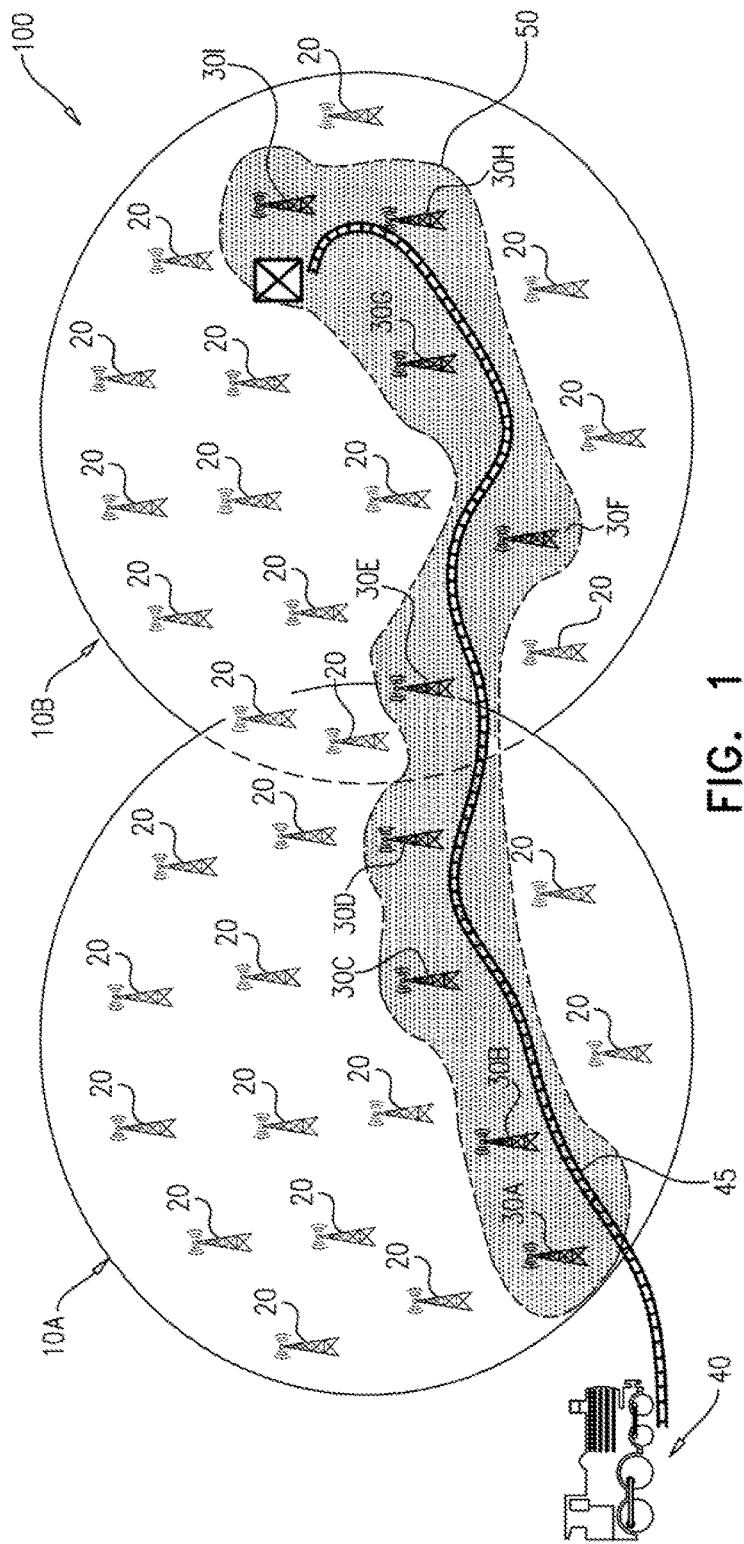
FIG. 1 is a pictorial illustration of a slice-based tracking area network, configured and operative in accordance with embodiments described herein.

A method for optimizing tracking areas for user equipments (UEs) is implemented in a mobile network and includes: defining network slices as a function of UE types, where UEs in the mobile network are associated with the network slices according to the UE types, defining network slice specific tracking areas as groups of one or more mobile base stations according to the network slices; receiving a signal from a given UE from among the UEs at a receiving mobile base station from among the one or more mobile base stations, and paging the given UE in a network slice specific tracking area from among the network slice tracking areas, where the receiving mobile base station is in the network slice specific tracking area, and the given UE is associated with the network slice tracking area according to an associated UE type from among the UE types.

A method for optimizing tracking areas for user equipments (UEs) is implemented in a mobile network and includes: defining multiple versions of the tracking areas as groups of one or more mobile base stations, determining a temporally relevant tracking area from among the multiple versions according to temporal conditions, receiving a signal from a given UE at a receiving mobile base station from the one or more mobile base stations, and paging the given UE in the temporally relevant tracking area, where the receiving mobile base station is in the temporally relevant tracking area.

A mobile base station includes: an antenna; a transceiver operative to communicate with a user equipment (UE) via said antenna; a processor; and a mobility control application to be executed by said processor and operative: to provide to said UE when in communication with said mobile base station at least a relevant tracking area list from among at least two tracking area lists associated with said mobile base station.

Detailed Description of Example Embodiments

It will be appreciated that TA planning is typically cell-centric where the network is partitioned into TAs from a statistical perspective of cell-based load and coverage metrics. Accordingly, in a Long-Term Evolution (LTE) network, the TAs are defined as groups of evolved node Bs (eNodeBs) with a comparatively high probability of mobility transitions within the TA and a comparatively low probability of inter-TA UE transitions. This eNodeB-centric approach is effectively predicated on an assumption of a generally uniform "mobility profile" (i.e., typical mobile behavior) for all of the UEs serviced by the same network.

However, it will be appreciated that in modern mobile networks, the mobility profile of UEs may not necessarily be assumed to be uniform. For example, handheld phones tend to be mobile, whereas eHealth or security devices are typically stationary. Furthermore, the movement of an Internet of Things (IoT) UE embedded into an automatic industrial transportation platform may be expected to differ from the movement of a handheld mobile phone. It will therefore be appreciated that a TA set up efficiently for one type of device, may be less efficient for another type.

Reference is now made to FIG. 1 which is a schematic illustration of a slice-based tracking area network 100, configured and operative in accordance with embodiments described herein. Network 100 comprises eNodeBs 20 and 30 organized into tracking areas 10A and 10B. eNodeBs 30 are arrayed in the vicinity of train tracks 45 on which automated rail car 40 runs as it progresses through both tracking areas 10A and 10B. Tracking areas 10A and 10B represent typical eNodeB-centric tracking areas which may be used to page UEs as necessary. For example, assuming a uniform paging profile for all UEs in network 100, in the event of an incoming call/session for an idle-state UE located anywhere in tracking area 10A, network 100 may page all eNodeBs 20 and 30 in tracking area 10A.

It will be appreciated that the depiction of network 100 as an LTE network with eNodeBs 20 and 30 may be exemplary. The embodiments described herein may support implementation in the context of any mobile network employing tracking areas for groups of mobile base stations to page idle UEs. Specifically, the methods described herein for LTE tracking areas may also be implemented in generally the same manner for Global System for Mobile Communications (GSM) location areas and Universal Mobile Telecommunications System (UMTS) routing areas. It will similarly be appreciated that in LTE implementations, home eNodeBs (HeNBs) may be employed in a similar manner in addition to, or instead of, eNodeBs.

In accordance with the exemplary embodiment of FIG. 1, automated rail car 40 may be at least partially controlled by an embedded IoT UE in communication with network 100. As automated rail car 40 progresses along train tracks 45 it may pass through the coverage areas of eNodeBs 30A, 30B, 30C, 30D, and 30E which are all located in tracking area 10A. It will be appreciated that the location of train tracks 45 effectively prevents automated rail car 40 from ever entering the coverage areas of eNodeBs 20 in tracking area 10A. Accordingly, it will be appreciated that using a uniform paging profile may be inefficient in the event of an incoming call/session for automated rail car 40. Triggering a page in all of Tracking Area 10A, even though automated rail car 40 may not have been near the paging eNodeBs 20, would be a waste of resources.

It will similarly be appreciated, that as automated rail car 40 proceeds to the edge of tracking area 10A, additional resources may be wasted. For example, as depicted in FIG. 1, eNodeB 30E is in both tracking area 10A and 10B. If automated rail car 40 entered an idle state near eNodeB 30E, a subsequent page may be sent to both tracking areas 10A and 10B, even though automated rail car 40 may never enter the coverage area of any of the involved eNodeBs 20. In some situations, a ping pong effect may also occur that may also lead to additional paging overheads. For example, if train tracks 45 progressed along a border between tracking areas 10A and 10B, automated rail car 40 may send repeated updates as it moves in and out of the two tracking areas 10.

In accordance with embodiments described herein, tracking areas may be configured on a per network slice basis, thereby accommodating different movement profiles for different types of UEs. Each network slice may represent the network services provided for a type of UE on network 100. For example, a network slice may be defined for IoT transport devices such as automated rail car 40. Tracking area 50 for the IoT transport device network slice may be defined based on the actual route typically taken by automated rail car 40 through the previously used tracking areas 10.

As depicted in FIG. 1, tracking area 50 comprises eNodeBs 30. While it may be relatively unlikely for a handheld mobile phone to move from eNodeB 30A to eNodeB 30G while in an idle state, it may be likely for automated rail car 40 to do so due to the layout of train tracks 45.

Network 100 may therefore use tracking area 50 to page automated rail car 40 as necessary. Similarly, network 100 may use tracking areas 10A and 10B to page handheld mobile phones whose movements are typically are less constrained and less predictable than automated rail car 40.

It will be appreciated that tracking areas 10 and tracking area 50 may overlap to some extent. For example, eNodeBs 30E, 30F, 30G, 30H and 30I may be associated with both tracking area 10B and tracking area 50. There are however, eNodeBs 20 that are associated with tracking area 10B that are not associated with tracking area 50. Similarly, eNodeBs 30A, 30B, 30C, 30D are associated with tracking area 50, but not tracking area 10B.

It will be appreciated that the embodiments described herein support the configuration of additional tracking areas as well. For example, each individual eNodeB 20 or 30 may be configured as a separate tracking area for relatively static IoT devices such as eHealth or security devices which are typically stationary.

It will similarly be appreciated that different network slices may have different paging profiles. For example, a security device may be paged frequently to ensure that it is functioning properly and has not been tampered with. An eHealth device or fire detection device may also be assigned a shorter timer than other types. Similarly, a detach inactivity timer may be assigned different values for different network slices.

Tracking area cell lists representing which eNodeBs 20 and/or 30 belong to a given tracking area 10 or 50 may be generated autonomously and/or manually per network slice based on a variety of inputs.

For example, tracking areas may be generated using historical statistics of actual signaling events in network 100 on a per network slice basis. Such signaling events may include actual paging responses occurring in specific cells. History for handovers between specific cells may also be used, at least in part, to define tracking areas. For example, if a given eNodeB 20 historically has a relatively high rate of handover with a second eNodeB 20, i.e., UEs often pass from the given eNodeB 20 to the second eNodeB 20, then the two eNodeBs may be grouped into the same tracking area. Conversely, there are relatively few handovers between two eNodeBs 20, they may be assigned to different tracking areas.

The particular device type of the UE(s) associated with a network slice may also be a factor in the generation of tracking area cell lists. For example, as discussed hereinabove, devices with relatively high mobility may be better served by relatively larger tracking areas. Whereas stationary devices may be better served by smaller tracking areas, even comprising just a single eNodeB 20 or 30.

The paging success rate may also be a factor in the maintenance of tracking area cell lists. For example, based on the considerations discussed hereinabove, eNodeB 30D may be added to the tracking area cell list for tracking area 10B. The added cell, i.e., eNodeB 30D, may be kept in (or removed from) tracking area 10B based on the observed effect on its paging success rate, i.e., if the success rate goes up, eNodeB 30D may be kept in tracking area 10A; otherwise, it may be removed. Similarly, eNodeB 30E may be removed from either or both of 10A or 10B based on its observed paging success rate within tracking areas 10.

It will be appreciated that tracking areas may be regenerated on a periodic basis. In accordance with embodiments described herein, the frequency of such periodic regeneration may be at least in part a function of the mobility profile for a given network slice. Alternatively, or in addition, the tracking areas may be regenerated in response to a detected change in mobility patterns for devices associated with the associated network slice(s).

In accordance with embodiments described herein, one network slice may be designated as a default network slice for UE types that are either unidentified and/or otherwise not specifically associated with a specific network slice.

Once defined, the tracking areas will be updated in a main mobility signaling node for network 100, e.g. a Mobility Management Entity (MME) in an LTE network. The MME then will make a Domain Name System (DNS) query for every Downlink Data Notification (DDN) received from a service gateway (e.g., Cisco Service Gateway) for a specific UE and will page it according to its associated tracking area.

In operation, when a UE camps on a new cell, e.g., eNodeB 20 or 30, the UE has to check whether the new cell belongs to the same tracking area as the previous cell. In accordance with embodiments described herein, either of two different techniques may be used to provide the UE with the tracking area code (TAC) for the cell's slice-based tracking area, i.e., the tracking area relevant to the UE's network slice. If there is a comparatively small number of tracking areas per cell, the cell may broadcast each of the relevant tracking area lists. It will be appreciated that the UE may regularly initiate communication with the MME, for example, a network attach request or tracking area update request. In response the MME may provide the UE an indication of its relevant network slice based on a lookup query (e.g., a DNS query as described hereinabove). The UE may be operative to use this provided indication to determine which TAC to use based on the broadcasted tracking area lists. In an LTE network, dedicated core networks (DECOR) may be used to identify the network slice to which a given UE belongs.

Alternatively, the cell may transfer equivalent information to the UE in unicast, after certain events, such as a network attach request or tracking area update request. In response to such a request, the MME may provide the indication of the relevant network slice to the cell which may then respond to the UE with information regarding the tracking area list per the UE's associated network slice.

Figure 2:
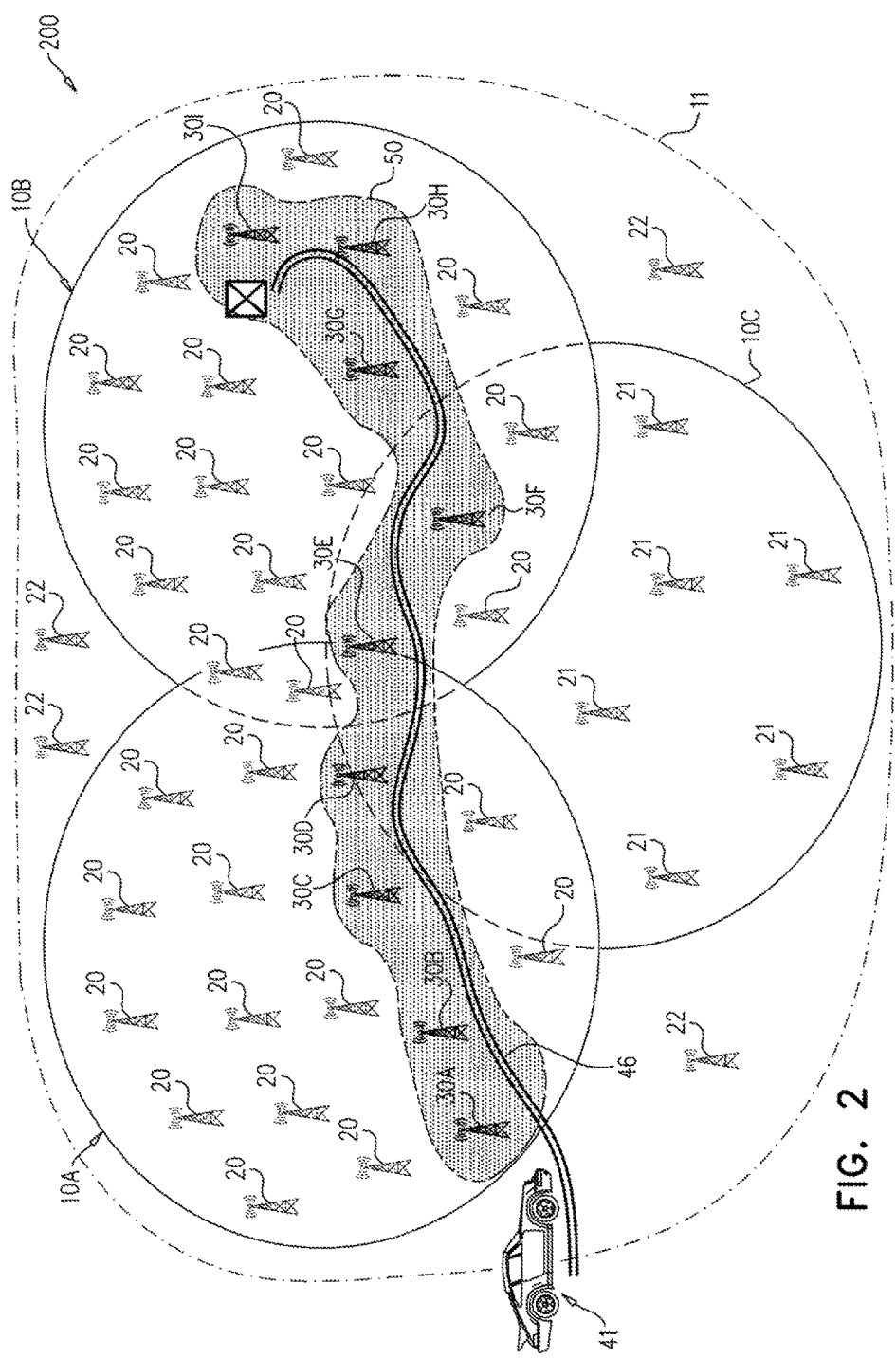
FIG. 2 is a pictorial illustration of an alternate configuration of the network of FIG. 1.

Reference is now made to FIG. 2 which is a pictorial illustration of an alternate configuration of network 100, herein labeled as network 200. Similar reference numerals refer to similar elements in FIG. 1. Instead of automated rail car 40 and train tracks 45 as in FIG. 1, network 200 comprises car 41 and highway 46. Car 41 may have car phone device installed such that it may be constrained to move along roadways such as, for example, highway 46. Network 200 also comprises tracking area 10C which may be configured to provide service to the same network slice as tracking areas 10A and 10B. Tracking area 10C comprises eNodeBs 21 in addition to eNodeBs 20 and 30 shared with tracking areas 10A and 10B.

In accordance with embodiments described herein, a tracking area may be differentiated per a variety of temporal factors in addition to, or instead of, network slices. For example, tracking area 50 may be adjusted according to the time of day, and/or how recently car 41 has signaled the network. It will be appreciated that the speed of car 41 (and therefore the movement of the signaling device) may be a function of the time of the day. For example, car 41 may typically move much more slowly along highway 46 during rush hour than at midnight. Accordingly the configuration for tracking area 50 may be redefined for different times of day.

For example, during rush hour, tracking area 50 may redefined as two different tracking areas, where eNodeBs 30A, 30B, 30C, 30D and 30E may be in one tracking area, and eNodeBs 30E, 30F, 30GC, 30H and 30I may be in a second tracking area.

Similarly, the size of a tracking area may be a function of location and time of the most recent signal received from the UE. For example, tracking area 50 may be defined to conform to a 10 mile stretch of highway going west to east (e.g., highway 46). If car 41 signaled at 10:00 AM that it was at the beginning of the stretch (e.g., in the coverage area of eNodeB 30A), then it may not be necessary to page all of tracking area 50 one minute later for an incoming call/session (since it may not be reasonable to expect that car 41 would more than a mile or two by that time). Accordingly, a subset of tracking area 50, e.g., eNodeBs 30A, 30B, 30C, and 30D, may be defined to accommodate the expected location of car 41 and conserve resources in the rest of tracking area 50. Similarly, if, for example, tracking areas 10a, 10B, and 10C represent non-residential, industrial areas, cell traffic patterns may be distinctly different during the day and night. Since significantly less traffic may be expected at night, it may be advantageous to combine tracking areas 10A, 10B, and 10C into a single tracking area 11 which also comprises additional eNodeBs 22 which were not served by tracking areas 10.

Tracking areas may also be adjusted seasonally to accommodate for seasonal usage patterns. For example, in a resort area, mobile usage patterns change during tourist season. In such a scenario, tracking areas 10A, 10B, and 10C may represent tracking areas for tourist season, whereas tracking area 11 may represent a tracking are for offseason.

A tracking area may also be adjusted for specific and/or recurring events. For example, eNodeB 30I may provide coverage for a baseball stadium. It will be appreciated that if a UE such as a mobile handheld phone is in the area of a baseball stadium when a baseball game starts, it will likely be there for another couple of hours with relatively little mobility. Accordingly, a temporally-based tracking area may be defined comprising eNodeB 30I for a period of time corresponding to a scheduled baseball game. However, during the rest of the day, eNodeB 30I may not be associated with the temporally-based tracking area. It will be appreciated that event schedules may be available in order to properly plan the implementation of such temporally-based tracking areas.

Tracking areas may also be configured to adjust dynamically according to current conditions. For example, the mobile operator may receive real time traffic updates for highway 46 from external sources, and resize tracking area 50 based on current traffic conditions. Alternatively, or in addition, the mobile operator may determine current traffic conditions internally based on time lapsed in between tracking area entry/exit signals and/or cell tower tradeoffs for ongoing call/sessions.

Figure 3:
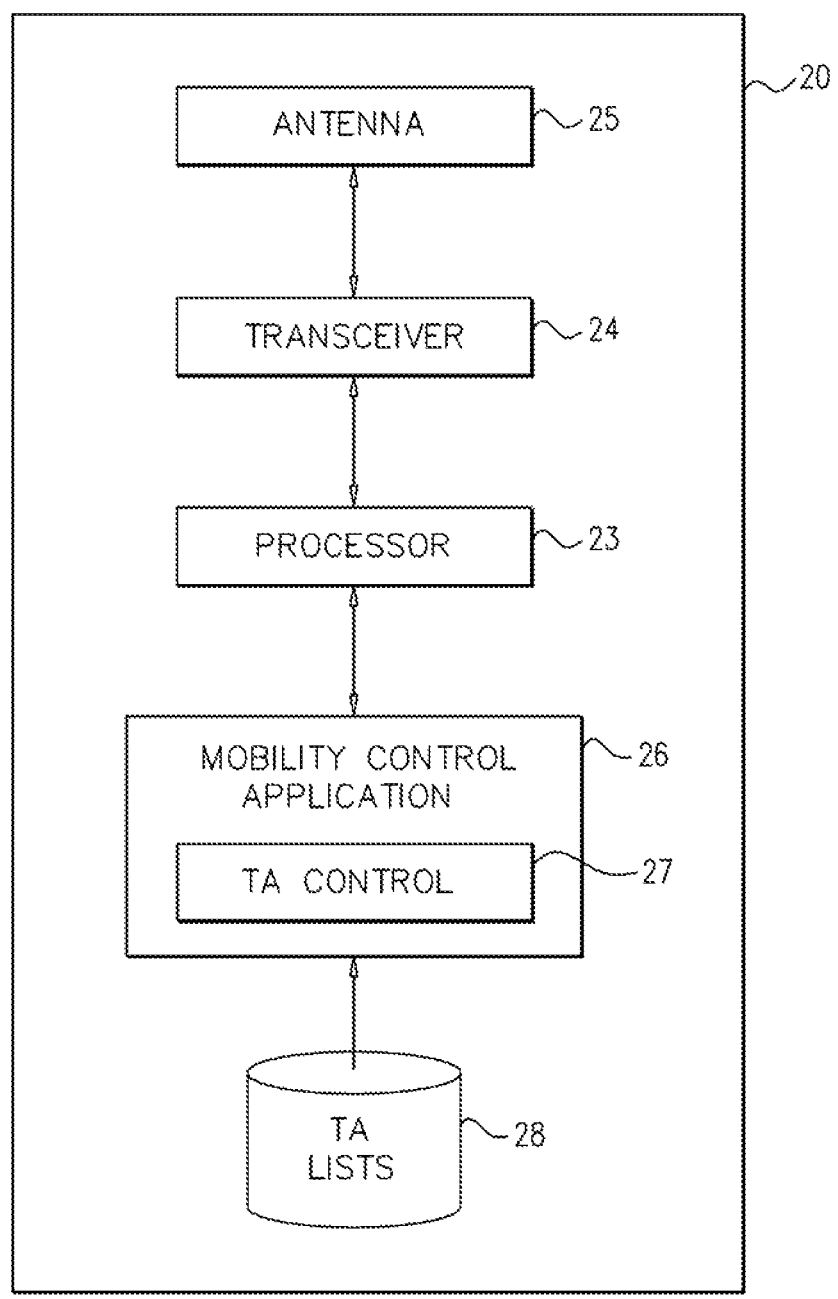
FIG. 3 is a block diagram of an exemplary eNodeB in the network of FIGS. 1 and 2.

Reference is now also made to FIG. 3 which is a block diagram drawing of an exemplary eNodeB 20, constructed and operative in accordance with embodiments described herein. It will be appreciated that eNodeBs 21, 22 and 30 may be similarly configured as eNodeB 20. eNodeB 20 comprises processor 23, transceiver 24, antenna 25, and mobility control application 26. Mobility control application 26 is implementable as either a software application and/or hardware component and is executable by processor 23 to facilitate paging and signaling operations with UEs in the coverage area of eNodeB 20. Processor 23 also operates transceiver 24 and antenna 25 in support of paging/signaling with UEs as per instructions provided by mobility control application 26.

In accordance with embodiments described herein, mobility control application 26 comprises tracking area control 27. Tracking area control 27 is implementable as either a software application and/or hardware component that may be implemented as either an integrated component of mobility control application 26 or as an independent module in communication with mobility control application 26. Tracking area control 27 is configured to employ tracking lists 28 to support the methods described herein for providing slice-based and/or temporally-based tracking areas in a mobile network.

It will be appreciated that the methods described herein may provide optimal tracking areas for the reduction of signaling overheads (e.g., network bandwidth and/or UE batteries for paging and/or polling) for different types of UEs, including IoT devices. It will similarly be appreciated that the impact of such a reduction in signaling overheads may be intensified by the trend for densification of eNodeBs in response to continual increases in the numbers of deployed IoT devices.

It is appreciated that software components of the embodiments of the disclosure may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the disclosure.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable subcombination.

It will be appreciated by persons skilled in the art that the embodiments of the disclosure are not limited by what has been particularly shown and described hereinabove. Rather the scope of the embodiments of the disclosure is defined by the appended claims and equivalents thereof:

What is claimed is:

1. A method for optimizing tracking areas for user equipments (UEs), the method implemented in a mobile network and comprising:
    defining tracking areas as groups of one or more mobile base stations;
    receiving a signal from a given UE at a receiving mobile base station from said one or more mobile base stations, wherein said receiving mobile base station is in at least one of said tracking areas;
    defining a temporally relevant tracking area by adjusting said at least one of said tracking areas according to current temporal conditions, wherein said adjusting comprises at least one of: adding another mobile base station to said at least one of said tracking areas, or removing another mobile base station from said at least one of said tracking areas; and
    paging said given UE in said temporally relevant tracking area, wherein said receiving mobile base station is in said temporally relevant tracking area.

2. The method according to claim 1 and wherein said current temporal conditions are at least one of time of day, day, day of week, or season.

3. The method according to claim 1 and wherein said current temporal conditions are real-time automobile traffic conditions.

4. The method according to claim 1 and wherein said defining comprises:
    defining network slices as a function of UE type; and
    defining network slice specific tracking areas as said groups of one or more mobile base stations according to said network slices, wherein said tracking areas are defined as network slice specific tracking areas.

5. The method of claim 4, wherein said defining network slice tracking areas comprises: defining multiple versions of at least one of said network slice specific tracking areas for a given network slice; and determining said network slice specific tracking area from among said multiple versions according to temporal conditions.

6. The method of claim 4, wherein said UE type is a handheld mobile phone.

7. The method of claim 4, wherein said UE type is an Internet of Things (IoT) transport device.

8. The method of claim 4, wherein said UE type is a stationary IoT device.

9. The method of claim 1, wherein said mobile network is a Long-Term Evolution (LTE) network and each of said one or more mobile base stations is an Evolved Node B (eNodeB) or a Home eNodeB (HeNB).

10. A system for optimizing tracking areas for user equipments (UEs), the system implemented in a mobile network and comprising:
    means for defining tracking areas as groups of one or more mobile base stations;
    means for receiving a signal from a given UE from among said UEs at a receiving mobile base station from among said one or more mobile base stations, wherein said receiving mobile base station is in at least one of said tracking areas;
    means for defining a temporally relevant tracking area by adjusting said at least one of said tracking areas according to current temporal conditions by at least one of: adding another mobile base station to said at least one of said tracking areas, or removing another mobile base station from said at least one of said tracking areas; and
    means for paging said given UE in said temporally relevant tracking area, wherein said receiving mobile base station is in said temporally relevant tracking area.

11. The system of claim 10, wherein said current temporal conditions are at least one of time of day, day, day of week, or season.

12. The system of claim 10, wherein said current temporal conditions are real-time automobile traffic conditions.

13. The system of claim 10, where said means for defining is configured to:
    define network slices as a function of UE type; and
    define network slice specific tracking areas as said groups of one or more mobile base stations according to said network slices, wherein said tracking areas are defined as network slice specific tracking areas.

14. The system of claim 13, wherein said means for defining is configured to define multiple versions of at least one of said network slice specific tracking areas for a given network slice; and to determine said network slice specific tracking area from among said multiple versions according to temporal conditions.

15. The system of claim 13, wherein said UE type is a handheld mobile phone.

16. The system of claim 13, wherein said UE type is an Internet of Things (IoT) transport device.

17. The system of claim 13, wherein said UE type is a stationary IoT device.

18. The system of claim 10, wherein said mobile network is a Long-Term Evolution (LTE) network and each of said one or more mobile base stations is an Evolved Node B (eNodeB) or a Home eNodeB (HeNB).

* * * * *